United States Patent
Yin (10) Patent No.: US 10,613,308 B2
(45) Date of Patent: Apr. 7, 2020

(54) METHOD AND MICROSCOPE FOR MEASURING AND CALCULATING HEIGHTS ON CURVED SURFACE OF MICROSCOPE SLIDE

(71) Applicant: Yuefeng Yin, Suzhou (CN)

(72) Inventor: Yuefeng Yin, Suzhou (CN)

(*) Notice: Subject to any disclaimer, the term of this patent is extended or adjusted under 35 U.S.C. 154(b) by 130 days.

(21) Appl. No.: 15/844,570

(22) Filed: Dec. 17, 2017

(65) Prior Publication Data

US 2018/0149846 A1  May 31, 2018

Related U.S. Application Data

(63) Continuation of application No. PCT/CN2016/108471, filed on Dec. 4, 2016.

(30) Foreign Application Priority Data

Nov. 30, 2016 (CN) .......................... 2016 1 1077830
Nov. 15, 2017 (CN) .......................... 2017 1 1133272

(51) Int. Cl.
  *G02B 21/00* (2006.01)
  *G01B 11/06* (2006.01)
  *G02B 21/36* (2006.01)
  *G01B 21/04* (2006.01)

(52) U.S. Cl.
  CPC ........ *G02B 21/002* (2013.01); *G01B 11/0608* (2013.01); *G01B 21/042* (2013.01); *G02B 21/367* (2013.01)

(58) Field of Classification Search
  CPC .... G02B 21/002; G02B 21/367; G02B 21/00; G02B 21/34; G01B 11/0608; G01B 21/042; G01B 11/06

USPC ........ 359/368, 396–398, 362, 391; 356/601, 356/614, 244, 246; 435/305.1, 305.2; 436/46; 206/316.1, 456; 73/864.91
See application file for complete search history.

(56) References Cited

U.S. PATENT DOCUMENTS

| | | | |
|---|---|---|---|
| 7,596,249 B2* | 9/2009 | Bacus | G02B 21/367 382/128 |
| 2012/0312957 A1* | 12/2012 | Loney | G02B 21/245 250/201.3 |
| 2013/0242384 A1* | 9/2013 | Zhou | G02B 21/26 359/382 |
| 2014/0009595 A1* | 1/2014 | Uchiyama | H04N 7/18 348/79 |
| 2014/0152794 A1* | 6/2014 | Takahashi | G01B 11/24 348/79 |
| 2014/0152888 A1* | 6/2014 | Staker | H04N 5/2251 348/373 |
| 2014/0218503 A1* | 8/2014 | Gerling | G01B 7/28 348/92 |

(Continued)

*Primary Examiner* — Arnel C Lavarias
(74) *Attorney, Agent, or Firm* — Erson IP (Nelson IP)

(57) ABSTRACT

A method for measuring and calculating the height of a microscope slide and estimating the position of the microscope slide in a microscope system based on the height is provided so as to obtain a clear image under continuous scanning at high magnification. In the present invention, a standard microscope slide is used as a template to obtain heights of all standard measurement points on another microscope slide to be measured. The method is realized through a conversion relationship of a functional equation set of coordinates and the heights.

3 Claims, 3 Drawing Sheets

(56) References Cited

U.S. PATENT DOCUMENTS

2014/0267675 A1* 9/2014 Matsunobu ............ H04N 7/183
   348/80
2015/0358533 A1* 12/2015 Tanaka ................. G02B 21/244
   348/80
2016/0080632 A1* 3/2016 Iwase ................... G02B 21/367
   348/79
2016/0328635 A1* 11/2016 Dave .................... G06K 19/022
2018/0143214 A1* 5/2018 Bueren ................ G02B 21/365
2018/0364469 A1* 12/2018 Sakamoto ............. G02B 21/26
2018/0373015 A1* 12/2018 Sakamoto ............ G02B 21/245

* cited by examiner

METHOD AND MICROSCOPE FOR MEASURING AND CALCULATING HEIGHTS ON CURVED SURFACE OF MICROSCOPE SLIDE

FIELD OF THE INVENTION

The present invention relates to a method for measuring and calculating heights of points on a curved surface of a curved object through measuring coordinates and heights of a plurality of points on another curved surface object with a standard size and material which are the same as those of the curved surface object to be measured and calculated, and particularly relates to a method for measuring and calculating heights on a curved surface of a microscope slide, which is applied to microscopic scanning for fast imaging.

BACKGROUND OF THE INVENTION

The outer surface of any object can be regarded as a regular or irregular curved surface. Surfaces of precise components manufactured with modern advanced technologies are already very "flat", and it is hence difficult to see changes of "heights" on the curved surfaces of these precise components with human eyes. However, in some scientific fields requiring extreme precision, for example, in a microscopic world magnified by an optical microscope, subtle changes can be magnified many times, thereby greatly affecting observation results and quality of images photographed by the microscope. Especially, a subtle change of heights on the curved surface of a microscope slide may cause a change of a distance between a sample on the microscope slide and the microscope lens. At low magnification, a depth of field (DOF) is large (the DOF is the distance between the nearest and farthest objects in a scene that appear acceptably sharp in an image formed in front of a microscope lens or other imagers; after being focused, clear images can be formed in front and at back of the focus; and the distance between the front and the back is called the DOF), so an effect of the DOF on imaging of the sample is limited, the distance between the sample and the lens still falls within the DOF without adjusting the distance between the adjustable lens and the microscope slide, and it is hence still capable of obtaining clear images. However, at high magnification (for example, above 100 times), since the DOF is small, a subtle height change (in micron dimension) of the curved surface of the microscope slide may cause that the distance between the sample on the microscope slide and the microscope lens exceeds the DOF, the image observed is hence blurry, and the image photographed is also blurry.

As described above, the change of height on the curved surface of the microscope slide may greatly affect the quality of image at high magnification. Since a microscope slide is usually fully covered with several samples (the samples are objects to be observed which are placed on the microscope slide; a plurality of samples may be placed on the same microscope slide; and a region of the microscope slide covered by each of the samples is defined as a surface region), a plurality of observations must be done to the samples for each microscope slide. Since the microscope lens is immobile, the samples are moved to the lens for observation under the driving of a metal rail platform movable in a transverse direction and a longitudinal direction which is used for supporting the microscope slides. In order to obtain clear image, the distance between the lens and the microscope slide must be adjusted for different samples to ensure the distance between the sample and the lens is within the DOF. At low magnification, since the DOF is large, the subtle change of height on the curved surface of the microscope slide will not affect imaging definition substantially. However, at high magnification, for example above 100 times, since the DOF is small, a micrometer-scale change of height on the curved surface of the microscope slide may cause the samples exceeding the DOF. Thus, it needs to adjust the distance between the lens and the microscope slide manually. Therefore, the efficiency at high magnification is very low, which hence brings great obstacles to scientific research and technology development because there are many samples placed on one microscope slide and the distance needs to he readjusted during each observation of the samples.

In a previously applied patent with a publication number of CN104730702, a shooting method of a microscopic scanning platform for realizing continuous scanning is disclosed. An adjustment of the distance between the lens and the standard microscope slide on an object stage is corrected by measuring the height change of the object stage. However, the influence of the height change of the curved surface of the microscope slide on the image shot by the microscope is still not overcome.

In an invention patent with a publication number of CN102298206, a focusing method (referring to paragraph 0019 of the description) is disclosed for calculating a characteristic quantity representing a focus shift degree of an illuminated field diaphragm based on an output signal generated by an image pickup element, and for driving an illuminated field diaphragm focus adjustment mechanism based on the calculated characteristic quantity to adjust an imaging position of the illuminated field diaphragm imaging. In this invention, a thickness change (i.e., the height change of the curved surface) of the microscope slide is calculated according to difference images between two pictures shot at parts of the microscope slide with different thickness and according to an intensity difference between an output signal of a first image and an output signal of a second image. A position control part moves a position of a microscope stage toward an optical illumination system according to the thickness change calculated by a thickness change calculation module. The above solution provides a focusing method for calculating the characteristic quantity representing the focus shift degree of the illuminated field diaphragm based on the output signal generated by the image pickup element, and for driving the illuminated field diaphragm focus adjustment mechanism based on the calculated characteristic quantity to adjust the imaging position of illuminated field diaphragm imaging. However actually, it is a method with a large error when applied to a high-power microscope with magnification greater than 100 times and is unable to achieve auto-focused fast photographing and scanning.

Therefore, a method capable of accurately measuring and calculating the heights on the curved surface of the microscope slide at high magnification is provided in this disclosure, and the method is applied to the technical field of fast scanning of microscopes.

SUMMARY OF THE INVENTION

In order to solve the above technical problems, the present disclosure provides a method for measuring and calculating heights on a curved surface of a curved surface object. The method is capable of measuring and calculating the heights on the curved surface of the curved surface object, and specifically capable of being applied to measure and calculate the heights on the curved surface of the microscope slide and capable of correcting a distance between a microscope lens and the microscope slide according to the heights. Thus, a method capable of automatically scanning and photographing a plurality of samples on the microscope slide at high magnification is provided and a microscope is further provided.

Specifically, a method for measuring and calculating heights on a curved surface of a curved surface object comprises: introducing a standard curved surface object, dividing a measuring region on the standard curved surface object into a plurality of surface regions, and measuring a coordinate of a standard measuring point in each surface region and heights of a plurality of standard measuring points; providing another curved surface object to be measured with the same size and material as the standard curved surface object; dividing a measuring region on the curved surface object to be measured into surface regions with a same number as that of the standard curved surface object; measuring coordinates and heights of a plurality of standard measuring points within the measuring region on the curved surface object to be measured and substituting the coordinates and heights into an equation set for measuring and calculating the heights of the curved surface object to be measured to obtain a functional equation about the coordinates and the heights; and substituting a coordinate of a standard measuring point in any one of the surface regions on the curved surface of the curved surface object to be measured into the functional equation about the coordinates and the heights to calculate the height of the standard measuring point.

The method for measuring and calculating the heights on the curved surface of the curved surface object provided in the present disclosure is a technical solution proposed for objects with the same material and size, and preferably the objects having rectangular bottom surfaces. The measuring region refers to an area which can be imaged by an imaging tool such as a microscope, a video camera, and a camera optical imaging device. A position of the curved surface object in a plane coordinate is determined by acquiring the coordinate of the standard curved surface object in a measurement system of an optical device, so that each point within the measuring region can be marked, and the measured physical quantity of height is converted into data which can be displayed by a display system and calculated by a computer program. The data representing the physical quantity of height in the optical device system is defined as the height. A quantitative calculation method reflecting a change law of any variable physical phenomenon can be expressed by a mathematical expression. Technical ideas of the present disclosure are to apply the mathematical expression capable of reflecting the change law and to input a measurable quantity so as to calculate a value to be measured which conforms to the law. The coordinates of the standard curved surface object and the heights of the standard measuring points in the surface regions of the standard curved surface object are measurable quantities in the present invention. The standard curved surface object refers to a template object with a certain material and size. The curved surface object to be measured refers to another curved surface object with the same material and size as the standard curved surface object. The same size refers to having at least a same bottom area, a same bottom shape or a same length and width. The surface region is the area imaged by the imaging tool at a time. The standard measuring point is a point of an imaging center point of the imaging tool projected on the surface region. In the present disclosure, the height of the standard measuring point of the curved surface object to be measured is measured and calculated through the mathematical expression according to the measured coordinates of the standard measuring point of the standard curved surface object as a template and a plurality of measured heights on the curved surface.

Further, at least the heights of all the standard measuring points on a boundary line along an X-axis direction and all the standard measuring points on the boundary line along a Y-axis direction in the measuring region of the standard curved surface object, and the height of the standard measuring point farthest from an origin relative to the points within the measuring region of the standard curved surface object are measured.

Further, the coordinates between the standard measuring points on the standard curved surface object and on the curved surface object to be measured are in a one-to-one correspondence relationship. The so-called one-to-one correspondence relationship herein is understood as that shapes of the standard curved surface object and the curved surface object to be measured are exactly the same, and the coordinates of two objects will be completely coincident when placed in a same coordinate system.

Further, based on a three-dimensional coordinate system established by a measurement device during measurement, scale values indicating length measurement units are divided in the X-axis direction and the Y-axis direction of the coordinate system, so that the coordinates of the standard measuring points on the standard curved surface object and the curved surface object to be measured can be expressed by coordinate values; the heights are numerical values which can be calculated by an electronic computer; and the heights correspond to positions of the standard measuring points in a Z-axis direction in the coordinate system of the measurement device. The so-called three-dimensional coordinate system refers to a virtual coordinate system. Generally, the imaging device itself is a device with the three-dimensional coordinate system. Taking the microscope for example, a vertical direction in which the microscope lens moves is the Z-axis direction; and an object stage for placing the microscope slide falls into an X-Y axis plane coordinate system. The established virtual three-dimensional coordinate system in the present invention should be understood as a measurement system capable of measuring the length and width of a curved surface object and its position in the vertical direction. The X-axis direction and the Y-axis direction should be understood as a length direction and a width direction of the measuring region of an object, and the Z-axis direction as a height direction. For an automatic scanning microscope, the lens moves under the driving of a movement mechanism, and a moving distance is controlled by providing a small voltage or current via devices. Thus, computer programs are needed to control hardware devices. The heights are data with no physical significance which can be "read" by the computer program, and usually are data displayed by a display system in a microscope control system, such as a display screen. The program in the microscope maintains the corresponding relationship between the height and the position, so that the movement mechanism can drive the lens to a corresponding specific position according to the height.

Preferably, bottom surfaces of the standard curved surface object and the curved surface object to be measured are rectangular surfaces.

A method for measuring and calculating heights on a curved surface of the microscope slide comprises:

Dividing a measuring region of a known standard microscope slide into a plurality of surface regions, wherein a length of the measuring region along the X-axis direction is Lx, a length along the Y-axis direction is Ly, a coordinate of a standard measuring point B on any one of the surface regions within the measuring region is (x, y), a height of the point is measured as $Z_B(x, y)$, and the coordinates of points at four corners of the measuring region are (0, 0), (Lx, 0), (Lx, Ly) and (0, Ly) respectively; measuring the coordinates of the standard measuring points in each of the surface regions within the measuring region; and measuring at least all the heights $Z_B(x, 0)$ and $Z_B(0, y)$ on two boundary lines along the X-axis direction and along the Y-axis direction and a height $Z_B(Lx, Ly)$ of a point with a coordinate (Lx, Ly);

Providing another microscope slide to be measured with the same size as the standard microscope slide, wherein the coordinates of the points at the four corners of the measuring region of the microscope slide to be measured are (0, 0), (Lx, 0), (Lx, Ly) and (0, Ly) respectively; the heights of the points at the four corners are $Z_A(0, 0)$, $Z_A(Lx, 0)$, $Z_A(Lx, Ly)$ and $Z_A(0, Ly)$ respectively; then a point A with a coordinate (x, y) corresponding to a standard measuring point with a coordinate (x, y) in the measuring region of the standard microscope slide necessarily exists in the measuring region of the microscope slide to be measured; and a height of the point A is $Z_A(x, y)$;

Combining the following equations:
an equation for calculating a relative height of the standard measuring point on a boundary of the standard microscope slide:

$$D_B(x, 0) = \frac{(xn_{B1} + (Z_B(x, 0) - z_{B1})n_{B3})}{\sqrt{n_{B1}^2 + n_{B2}^2 + n_{B3}^2}} \quad (1)$$

$$D_B(0, y) = \frac{(yn_{B2} + (Z_B(0, y) - z_{B1})n_{B3})}{\sqrt{n_{B1}^2 + n_{B2}^2 + n_{B3}^2}}$$

wherein, $z_{B1}=Z_B(0,0), z_{B3}=Z_B(Lx,0), z_{B4}=Z_B(Lx,Ly)$, $n_{B1}=L_y(z_{B1}-z_{B3}), n_{B2}=L_x(z_{B1}-z_{B5}), n_{B3}=L_xL_y$, and ($n_{B1}$, $n_{B2}$, $n_{B3}$) is a normal vector of a plane defined by three standard measuring points with the coordinates (0, 0), (Lx, 0) and (0, Ly) on the standard microscope slide;

an equation for calculating a relative height of any one of the standard measuring points in the measuring region of the microscope slide to be measured:

$$D_A(x, y) = \quad (2)$$
$$D_B(x, 0) + f_x(x, a, L_x) + D_B(0, y) + f_y(y, b, L_y) + \frac{xyD_A(L_x, L_y)}{L_xL_y}$$

wherein, $f_x(x, a, L_K)$ is a height difference function for the points at the boundary along the X-axis direction of the microscope slide to be measured, and $f_y(y, b, L_y)$ is a height difference function for the points at the boundary along the Y-axis direction of the microscope slide to be measured;

an equation for calculating a relative height of the standard measuring point with the coordinate $$D_A(L_x, L_y) = \frac{(L_xn_{A1} + L_yn_{A2} + (z_{A4} - z_{A1})n_{A3})}{\sqrt{n_{A1}^2 + n_{A2}^2 + n_{A3}^2}} \quad (3)$$

wherein, $z_{A1}=Z_A(0, 0)$, $z_{A4}=Z_A(0, Ly)$;

$n_{A1}=L_y(z_{A1}-z_{A3}), n_{A2}=L_x(z_{A1}-z_{A5}), n_{A3}=L_xL_y$ (4);

wherein, $Z_{A3}=Z_A(Lx, Ly)$, $Z_{A5}$ $Z_A(0, Ly)$;

and an equation for converting the relative height $D_A(x, y)$ of any one of the points in the measuring region of the microscope slide to be measured into the height $Z_A(x, y)$:

$$D_A(x,y)\sqrt{n_{A1}^2+n_{A2}^2+n_{A3}^2}=n_{A1}x+n_{A2}y+n_{A3}(Z_A(x,y)-z_{A1}) \quad (5)$$

Obtaining an equation set about unknown numbers a, b, $z_{A1}$, $z_{A3}$, $z_{A4}$ and $z_{A5}$ according to the previous equations (1), (2), (3), (4) and (5):

$$\begin{cases} D_A(x_i, y_i) = \frac{(xn_{B1} + (Z_B(x_i, 0) - z_{B1})n_{B3})}{\sqrt{n_{B1}^2 + n_{B2}^2 + n_{B3}^2}} + f_x(x_i, a, L_x) + \\ \qquad \frac{(yn_{B2} + (Z_B(0, y_i) - z_{B1})n_{B3})}{\sqrt{n_{B1}^2 + n_{B2}^2 + n_{B3}^2}} + f_y(y_i, b, L_y) + \frac{x_iy_i}{L_xL_y} \\ \qquad \frac{(L_xn_{A1} + L_yn_{A2} + (z_{A4} - z_{A1})n_{A3})}{\sqrt{n_{A1}^2 + n_{A2}^2 + n_{A3}^2}} \quad ; \\ D_A(x_i, y_i)\sqrt{n_{A1}^2 + n_{A2}^2 + n_{A3}^2} = n_{A1}x + n_{A2}y + n_{A3}(z_i - z_{A1}) \\ n_{B1} = L_y(z_{B1} - z_{B3}), n_{B2} = L_x(z_{B1} - z_{B5}), n_{B3} = L_xL_y \\ n_{A1} = L_y(z_{A1} - z_{A3}), n_{A2} = L_x(z_{A1} - z_{A5}), n_{A3} = L_xL_y \end{cases} \quad (6)$$

and

Measuring the coordinates and the heights of any at least six standard measuring points in the measuring region of the microscope slide to be measured to obtain an input ($x_i$, $y_i$, $z_i$), substituting the input into the equation set (6) to obtain a functional equation of the coordinates and the heights, and then inputting the coordinate (x, y) of any one of the standard measuring points on the microscope slide to be measured to obtain the corresponding height $Z_A(x, y)$, wherein the microscope slide is a in standard rectangular structure; a region area of the microscope slide is the entire area automatically scanned by the microscope, or the region area of the samples tiled on the microscope slide becomes a measuring region area in practical application; the heights of a plurality of microscope slides to be measured can be measured and calculated according to the coordinates and the heights of one standard microscope slide as the template; and the measurement of the height of any one of the points on the curved surface of the microscope slide and the acquisition of specific position points in the measurement system through calculation have a wide industrial application value in the industrial field of precision instruments.

Preferably, the fx(x, a, Lx) is a polynomial with a power of $K_1$; the fy(y, b, Ly) is a polynomial with a power of $K_2$; the fx(x, a, Lx) and the fy(y, b, Ly) are mathematical expressions respectively used for describing an X-axis boundary and a Y-axis boundary of the measuring region. The number of the standard measuring points in the measuring region of the microscope slide to be measured is further limited as $K_1+K_2+2$ based on the power of the polynomials, and the coordinates and the heights of the $K_1+K_2+2$ standard measuring points are measured to obtain the input $(x_i, y_i, z_i)$ to be substituted into the equation set, wherein $K_1$ and $K_2$ are natural numbers greater than or equal to 1.

Further, a is a parameter of the height difference function for the points on the boundary along the X-axis direction of the microscope slide to be measured; and b is a parameter of the height difference function for the points on the boundary along the Y-axis direction of the microscope slide to be measured.

A scanning method is capable of obtaining images of the samples placed on any one of the surface regions of the microscope slide to be measured and capable of scanning automatically to obtain the images of all the samples placed on the microscope slide to be measured by applying the above method for measuring and calculating the heights on the curved surface of the microscope slide, Application of the present disclosure is as follows: the heights of a plurality of microscope slides to be measured can be measured through one standard microscope slide by applying the method provided in the present disclosure. The heights represent the positions of the corresponding standard measuring points in the vertical direction of the microscope. After calculating the height of each microscope slide to be measured, the position of each standard measuring point of a current microscopic scanning imaging device can be inferred actually. In order to obtain a clear scanned image, it requires the distance between the imaging device and the samples on the microscope slide falls within the DOF. When it needs to scan the image of the sample at one standard measuring point, it only needs data conversion so as to obtain a relative position between the imaging device and each standard measuring point on the microscope slide, which conforms to the DOF, and the clear image is then obtained by moving the imaging device to an appropriate position.

A microscope, to which above method for measuring and calculating the heights on the curved surface of the microscope slide or scanning method is applied, comprises a movement mechanism which is capable of moving up and down to adjust a distance between the microscope lens and the microscope slide. The height of each standard measuring point within a scanning scope of the microscope is calculated using the method for measuring and calculating the heights on the curved surface of the microscope slide. The height represents the data converted from the physical quantity of height of each standard measuring point in a microscope observation system, and the data can be calculated in a microscope calculation system. Therefore, the height of each standard measuring point actually represents the physical quantity of the corresponding height in the microscope observation system. At a fixed magnification, the relative distance between the microscope and the sample on the microscope slide is fixed for clear imaging. Therefore, the height of the microscope lens for clear imaging can be obtained as long as the height of each standard measuring point in the microscope observation system is known. The microscope will drive the movement mechanism to automatically adjust the distance between the lens and the microscope slide according to the height so that clear imaging is realized and the formed image is scanned or photographed to form image data for storage.

The following method is used for automatically scanning and imaging samples on the microscope slide and storing as data, specifically comprising the following steps:

step 1, providing a standard microscope slide; dividing a measuring region of the microscope slide into a plurality of surface regions, wherein a length of the measuring region along the X-axis direction is Lx, a length along the Y-axis direction is Ly, a coordinate of a standard measuring point B on any one of the surface regions within the measuring region is $(x, y)$, a height of the point B is measured as $Z_B(x, y)$, and coordinates of points at four corners of the measuring region in a clockwise direction are $(0, 0)$, $(Lx, 0)$, $(Lx, Ly)$ and $(0, Ly)$ respectively; measuring the coordinates of the standard measuring points in each of the surface regions in the measuring region; and measuring at least all the heights $Z_B(x, 0)$ and $Z_B(0, y)$ on two boundary lines respectively along the X-axis direction and the Y-axis direction and a height $Z_B(Lx, Ly)$ with a coordinate $(Lx, Ly)$;

step 2, providing another microscope slide to be measured with the same size as the standard microscope slide, wherein coordinates of points at the four corners in the measuring region of the microscope slide to be measured are $(0, 0)$, $(Lx, 0)$, $(Lx, Ly)$ and $(0, Ly)$ respectively; heights of the points at the four corners are respectively $Z_A(0, 0)$, $Z_A(Lx, 0)$, $Z_A(Lx, Ly)$, and $Z_A(0, Ly)$; then a point A with a coordinate $(x, y)$ corresponding to a standard measuring point with a coordinate $(x, y)$ in the measuring region of the standard microscope slide necessarily exists in the measuring region of the microscope slide to be measured; and the point A has a height of $Z_A(x, y)$;

step 3, substituting the obtained coordinates and heights into the following equations to obtain a functional equation of the coordinates and the heights on the microscope slide to be measured:

an equation for calculating a relative height of the standard measuring point on a boundary of the standard microscope slide:

$$D_B(x, 0) = \frac{(xn_{B1} + (Z_B(x, 0) - z_{B1})n_{B3})}{\sqrt{n_{B1}^2 + n_{B2}^2 + n_{B3}^2}} \quad (1)$$

$$D_B(0, y) = \frac{(yn_{B2} + (Z_B(0, y) - z_{B1})n_{B3})}{\sqrt{n_{B1}^2 + n_{B2}^2 + n_{B3}^2}}$$

wherein, $z_{B1}=Z_B(0,0), z_{B3}=Z_B(Lx,0), z_{B4}=Z_B(Lx,Ly)$, $n_{B1}=L_y(z_{B1}-z_{B3}), n_{B2}=L_x(z_{B1}-z_{B5}), n_{B3}=L_xL_y$, and $(n_{B1}, n_{B2}, n_{B3})$ is a normal vector of a plane defined by three standard measuring points with the coordinates $(0, 0)$, $(Lx, 0)$ and $(0, Ly)$ on the standard microscope slide;

an equation for calculating a relative height of any one of the standard measuring points in the measuring region of the microscope slide to be measured:

$$D_A(x, y) = D_B(x, 0) + f_x(x, a, L_x) + D_B(0, y) + f_y(y, b, L_y) + \frac{xyD_A(L_x, L_y)}{L_xL_y} \quad (2)$$

wherein, $f_x(x, a, L_K)$ is a height difference function for the points at the boundary along the X-axis direction of the microscope slide to be measured, and $f_x(y, b, L_y)$ is a height difference function for the points at the boundary along the Y-axis direction of the microscope slide to be measured;

an equation for calculating a relative height of the standard measuring point with the coordinate ($L_x$, $L_y$):

$$D_A(L_x, L_y) = \frac{(L_x n_{A1} + L_y n_{A2} + (z_{A4} - z_{A1})n_{A3})}{\sqrt{n_{A1}^2 + n_{A2}^2 + n_{A3}^2}} \quad (3)$$

wherein, $z_{A1} = Z_A(0, 0)$, $z_{A4} = Z_A(0, Ly)$;

$$n_{A1} = L_y(z_{A1} - z_{A3}), n_{A2} = L_x(z_{A1} - z_{A5}), n_{A3} = L_x L_y \quad (4);$$

wherein, $z_{A3} = Z_A(Lx, Ly)$, $z_{A5} = Z_A(0, Ly)$;
and an equation for converting the relative height $D_A(x, y)$ of any one of the points in the measuring region of the microscope slide to be measured into the height $Z_A(x, y)$:

$$\frac{D_A(x,y)}{\sqrt{n_{A1}^2 + n_{A2}^2 + n_{A3}^2}} = n_{A1} x + n_{A2} y + n_{A3}(Z_A(x,y) - z_{A1}) \quad (5);$$

obtaining an equation set about unknown numbers a, b, $z_{A1}$, $z_{A3}$, $z_{A4}$ and $z_{A5}$ according to the previous equations (1), (2), (3), (4) and (5):

$$\begin{cases} D_A(x_i, y_i) = \dfrac{(x n_{B1} + (Z_B(x_i, 0) - z_{B1})n_{B3})}{\sqrt{n_{B1}^2 + n_{B2}^2 + n_{B3}^2}} + f_x(x_i, a, L_x) + \\ \qquad \dfrac{(y n_{B2} + (Z_B(0, y_i) - z_{B1})n_{B3})}{\sqrt{n_{B1}^2 + n_{B2}^2 - n_{B3}^2}} + f_y(y_i, b, L_y) + \\ \qquad \dfrac{x_i y_i}{L_x L_y} \dfrac{(L_x n_{A1} + L_y n_{A2} + (z_{A4} - z_{A1})n_{A3})}{\sqrt{n_{A1}^2 + n_{A2}^2 + n_{A3}^2}} \quad ; \\ D_A(x_i, y_i)\sqrt{n_{A1}^2 + n_{A2}^2 + n_{A3}^2} = n_{A1} x + n_{A2} y + n_{A3}(z_i - z_{A1}) \\ n_{B1} = L_y(z_{B1} - z_{B3}), n_{B2} = L_x(z_{B1} - z_{B5}), n_{B3} = L_x L_y \\ n_{A1} = L_y(z_{A1} - z_{A3}), n_{A2} = L_x(z_{A1} - z_{A5}), n_{A3} = L_x L_y \end{cases} \quad (6)$$

and
measuring the coordinates and the heights of any at least six standard measuring points in the measuring region of the microscope slide to be measured to obtain an input ($x_i$, $y_i$, $z_i$), substituting the input into the equation set (6) to obtain a functional equation of the coordinates and the heights, and then inputting the coordinate (x, y) of any one of the standard measuring points on the microscope slide to be measured to obtain the corresponding height $Z_A(x, y)$;

step 4, after obtaining the heights of the standard measuring points in each of the surface regions on the microscope slide to be measured, a calculation module of the microscope being capable of deducing according to the height the distance between the lens and the microscope slide to be measured when the samples in the surface region corresponding to each of the standard measuring points on the microscope slide to be measured are imaged clearly and obtaining a position point of the lens within the scope of a microscope measurement system; and the movement mechanism driving the lens to move to the position point; and step 5, after moving the lens to the position point, the microscope photographing or scanning and imaging the samples automatically, and converting into data for storage.

Further, the fx(x, a, Lx) in the step 3 is a polynomial with a power of $K_1$; the fy(y, b, Ly) is a polynomial with a power of $K_2$; the fx(x, a, Lx) and fy(y, b, Ly) are mathematical expressions respectively used for describing an X-axis boundary and a Y-axis boundary of the measuring region.

The number of the standard measuring points in the measuring region of the microscope slide to be measured is further limited as $K_1+K_2+2$ based on the power of the polynomials, and the coordinates and the heights of the $K_1+K_2+2$ standard measuring points are measured to obtain the input ($x_i$, $y_i$, $z_i$) to be substituted into the equation set, wherein $K_1$ and $K_2$ are natural numbers greater than or equal to 1.

After completing the above steps, the driving mechanism moves the object stage so that the lens moves to a next standard measuring point. Since the heights of all the standard measuring points are known and the DOF is fixed, the movement mechanism automatically drives the lens to move in the vertical direction so that the distance between the lens and the microscope slide is appropriate and conforms to the DOF when observing each of the standard measuring points. The automatic imaging of each of the standard measuring points is automatically completed according to above principle.

The present invention has beneficial effects that the heights on the curved surface of any one of the microscope slides can be accurately measured, and the method for measuring and calculating the heights on the curved surface can be applied to automatic scanning microscopes to realize the fast micro image scanning of sample objects on the microscope slides. Particularly under high-power lens, advantages of high imaging definition, high scanning speed, high efficiency and automation of the present invention are more outstanding.

BRIEF DESCRIPTION OF THE DRAWINGS

In order to illustrate the technical solutions in embodiments of the present invention or in the prior art more clearly, drawings to be used in description of embodiments or the prior art will be introduced briefly below.

DETAILED DESCRIPTION OF THE EMBODIMENTS

Figure 1:
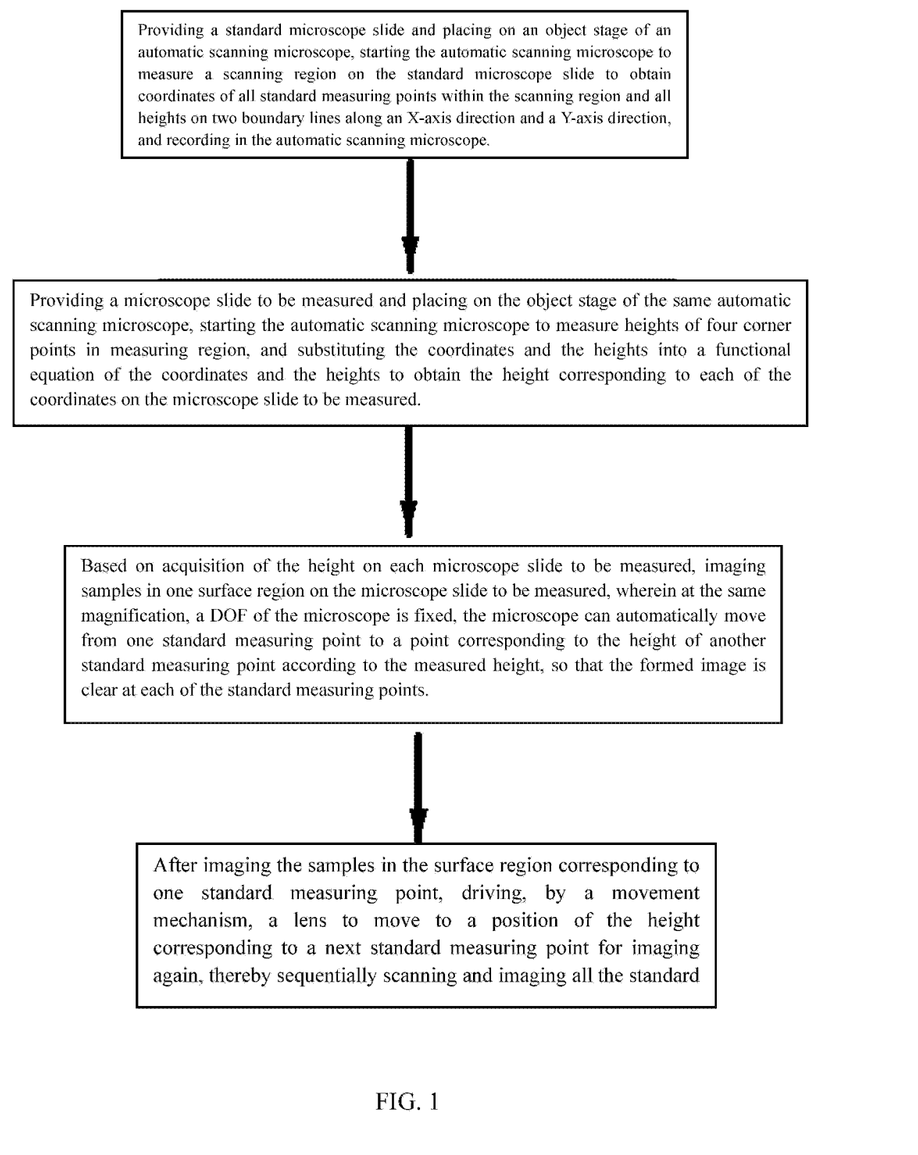
FIG. 1 is a flow chart showing steps for scanning a sample with a microscope according the present invention.
Figure 2:
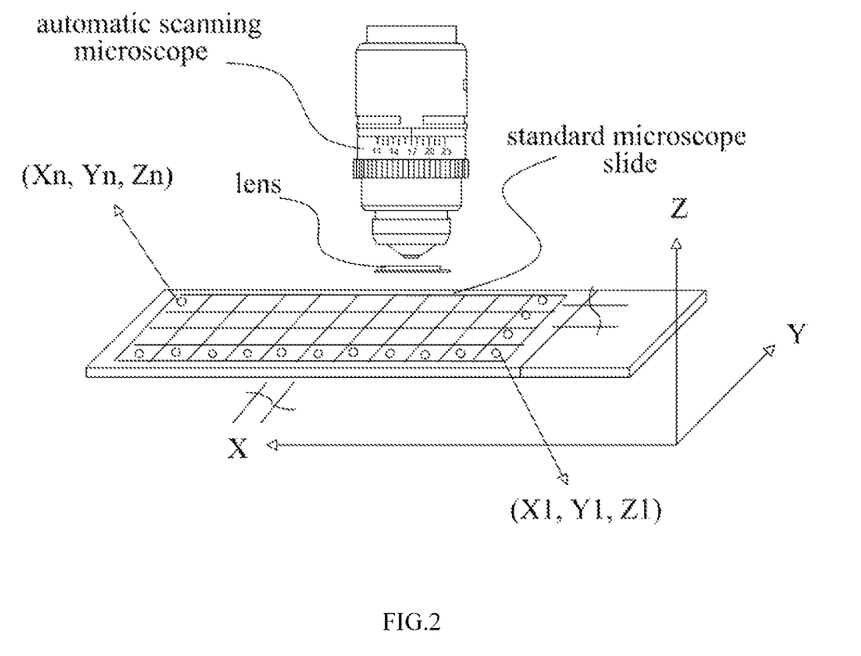
FIG. 2 is a diagram showing a scanning of a standard microscope slide with a microscope according the present invention.
Figure 3:
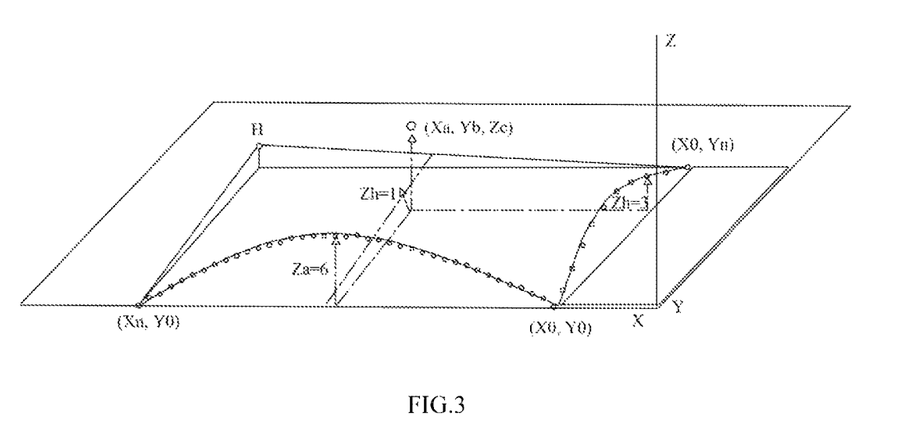
FIG. 3 is a coordinate chart showing a measurement value of the standard microscope slide according the present invention.
Figure 4:
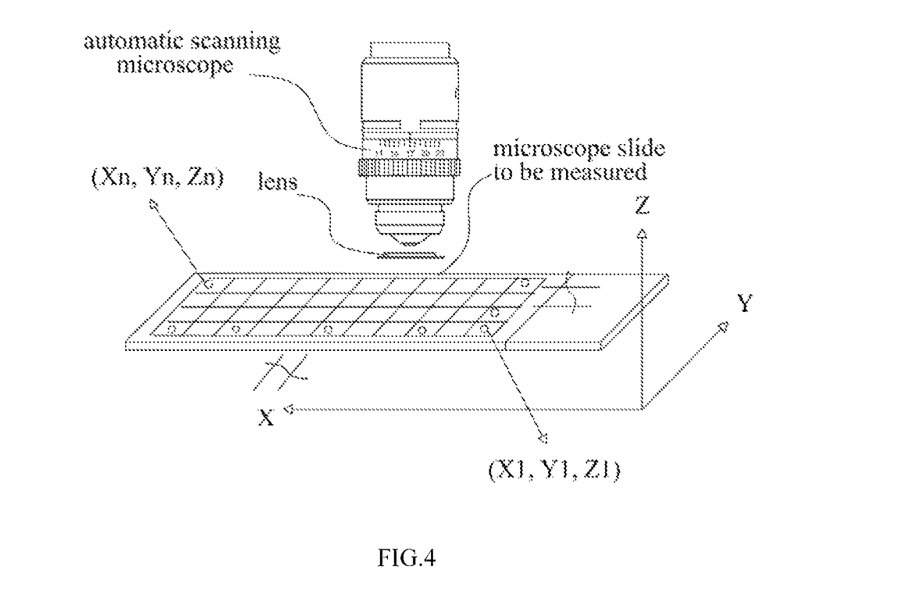
FIG. 4 is a diagram showing a scanning of a microscope slide to be measured with the microscope according the present invention.
Figure 5:
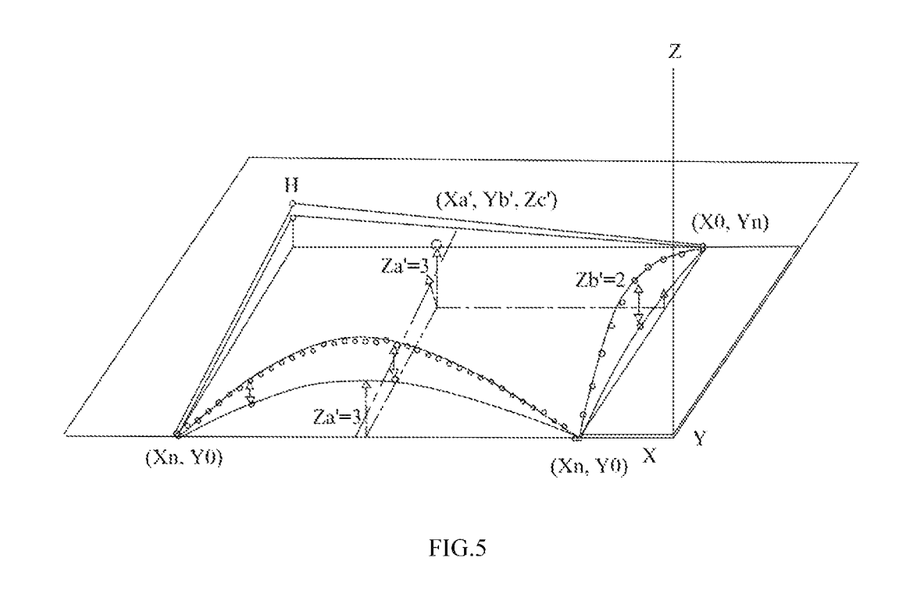
FIG. 5 is a coordinate chart showing a measurement value of the microscope slide to be measured according the present invention.

The technical solutions in embodiments of the present disclosure are clearly and completely described below with reference to the drawings in embodiments of the present disclosure.

A method for measuring and calculating heights on a curved surface of a microscope slide Embodiment 1:

Scanning of standard microscope slides: preparing a plurality of standard microscope slides; taking a plurality of blank microscope slides; uniformly coating a single layer of the sample on the microscope slides; accurately placing the microscope slides on a sample rack of a scanning instrument; setting a software to define a scanning region of 2.5 cm×1.5 cm in length and width; sampling scanning the region with 27 visual fields scanned at equal intervals in an X-axis direction, 13 visual fields scanned at equal intervals in a Y-axis direction and 351 visual fields sampled in the overall region; and after dropping oil onto the sample, using an NA1.25 100× lens of olympus company to focus a first line x(i, 0) (a value of i is 0-26) so as to obtain 27 focused heights $Z_B(i, 0)$ on an x axis:

0.5, 0.684568671, 0.913734812, 0.960046768, 1.024200047, 0.785085559, 0.871537623, 0.873252109, 0.464664036, 0.591254547, 0.601890489, 0.313716038, 0.444767363, 0.040638322, 0.055733448, −0.000528566, 0.143899998, −0.019396768, 0.111652866, 0.153505749, 0.231037957, 0.170316971, 0.105135102, −0.018024878, −0.011849608, 0.079061529, 0.5.

Focusing a coordinate of the first line in the Y-axis direction y(0, j) (a value of j is 0-12) to obtain 13 focused heights $Z_B(0, j)$ in a y axis:

0.871537622679038, 0.461904370950109, 0.480413250090982, 0.695155343637005, 0.330119561867232, 0.241593788675321, 0.367140841687643, 0.189416607038756, −0.153318678982108, −0.0812907632132054, 0.0754714097549614, −0.276182022011501, −0.382547507617886.

A focused height of the coordinate (26, 12) is 0.5.

Relative heights of standard measuring points on a boundary along the X-axis direction of the standard microscope slides are:

$$D_B(x, 0) = \frac{(xn_{B1} + (Z_B(x, 0) - z_{B1})n_{B3})}{\sqrt{n_{B1}^2 + n_{B2}^2 + n_{B3}^2}}; \quad (1)$$

wherein x=0, ... 26;

$z_{B1}=Z_B(0,0), z_{B3}=Z_B(Lx,0), z_{B4}=Z_B(Lx,Ly),$ $n_{B1}=L_y(z_{B1}-z_{B3}), n_{B2}=L_x(z_{B1}-z_{B5}), n_{B3}=L_xL_y,$ and then $D_B(i, 0), i=0, \ldots, 26$.

0, −0.1834, −0.4112, −0.4572, −0.5210, −0.2833, −0.3693, −0.3710, 0.0351, −0.0907, −0.1013, 0.1851, 0.0549, 0.4566, 0.4415, 0.4975, 0.3539, 0.5162, 0.3860, 0.3444, 0.2673, 0.3277, 0.3924, 0.5149, 0.5087, 0.4184, 0.

Relative heights of standard measuring points on a boundary along the Y-axis direction of the standard microscope slides are:

$$D_A(0, y) = \frac{(yn_{B2} + (Z_B(0, y) - z_{B1})n_{B3})}{\sqrt{n_{B1}^2 + n_{B2}^2 + n_{B3}^2}}; \quad (2)$$

wherein y=0, ... 12;

$z_{B1}=Z_B(0,0), z_{B3}=Z_B(Lx,0), z_{B4}=Z_B(Lx,Ly),$ $n_{B1}=L_y(z_{B1}-z_{B3}), n_{B2}=L_x(z_{B1}-z_{B5}), n_{B3}=L_xL_y,$ and then $D_B(0, j), j=0, \ldots, 12$.

0, 0.3033, 0.1810, −0.1363, 0.1226, 0.1068, −0.1219, −0.0491, 0.1876, 0.0122, −0.2475, −0.0018, −0.0000.

Scanning of the microscope slide to be measured: after dropping oil on the microscope slide to be measured, accurately placing the microscope slides to be measured on the sample rack, and selecting any 6 visual fields from the 351 sampled visual fields in the software (in order to improve the calculation accuracy, the selection conditions of the 6 visual fields are as follows: 1. the coverage area is as large as possible; 2. the 6 visual fields are distributed as follows: 5 of them form a pentagon, and the 6th one lie in a center of the pentagon). The coordinates $(x_i, y_i)$, i=1, ..., 6 of the 6 visual fields are (0, 0), (13, 0), (26, 0), (0, 6), (0, 12) and (26, 12).

Using the NA1.25 100× lens of olympus company to focus the 6 visual fields to obtain the focused heights $z_i$, i=1, ..., 6 of 5.59, 9.770, 7.127, 8.053, 7.674 and 9.27.

A height difference function for the points on the boundary along the X-axis direction of the microscope slide to be measured is:

$$f_x(x, a, L_x) = \frac{4ax(x - Lx)}{Lx^2}.$$

A height difference function for the points on the boundary along the Y-axis direction of the microscope slide to be measured is:

$$f_y(y, a, L_y) = \frac{4ay(y - Ly)}{Ly^2}.$$

The relative height of the standard measuring point with a coordinate (Lx, Ly) is:

$$D_A(L_x, L_y) = \frac{(L_xn_{A1} + L_yn_{A2} + (z_{A4} - z_{A1})n_{A3})}{\sqrt{n_{A1}^2 + n_{A2}^2 + n_{A3}^2}}; \quad (3)$$

wherein, $z_{A1}=Z_A(0, 0)$, $z_{A4}=Z_A(0, Ly)$.

$n_{A1}=L_y(z_{A1}-z_{A3}), n_{A2}=L_x(z_{A1}-z_{A5}), n_{A3}=L_xL_y \quad (4);$ wherein $z_{A3}=Z_A(Lx, Ly)$, $z_{A5}=Z_A(0, Ly)$.

An equation for converting the relative height $D_A(x, y)$ of any one of the points within the measuring region on the microscope slide to be measured into the height $Z_A(x, y)$ is:

$$D_A(x,y)\sqrt{n_{A1}^2+n_{A2}^2+n_{A3}^2}=n_{A1}x+n_{A2}y+n_{A3}(Z_A(x,y)-z_{A1}) \quad (5);$$

Obtaining an equation set about unknown numbers a, b, $z_{A1}$, $z_{A3}$, $z_{A4}$ and $z_{A5}$ according to the previous equations (1), (2), (3), (4) and (5):

$$\begin{cases} D_A(x_i, y_i) = \frac{(xn_{B1} + (Z_B(x_i, 0) - z_{B1})n_{B3})}{\sqrt{n_{B1}^2 + n_{B2}^2 + n_{B3}^2}} + f_x(x_i, a, L_x) + \\ \qquad \frac{(yn_{B2} + (Z_B(0, y_i) - z_{B1})n_{B3})}{\sqrt{n_{B1}^2 + n_{B2}^2 - n_{B3}^2}} + f_y(y_i, b, L_y) + \\ \qquad \frac{x_iy_i}{L_xL_y} \frac{(L_xn_{A1} + L_yn_{A2} + (z_{A4} - z_{A1})n_{A3})}{\sqrt{n_{A1}^2 + n_{A2}^2 + n_{A3}^2}} \\ D_A(x_i, y_i)\sqrt{n_{A1}^2 + n_{A2}^2 + n_{A3}^2} = n_{A1}x + n_{A2}y + n_{A3}(z_i - z_{A1}) \\ n_{B1} = L_y(z_{B1} - z_{B3}), n_{B2} = L_x(z_{B1} - z_{B5}), n_{B3} = L_xL_y \\ n_{A1} = L_y(z_{A1} - z_{A3}), n_{A2} = L_x(z_{A1} - z_{A5}), n_{A3} = L_xL_y \end{cases} \quad (6)$$

Solving to obtain values of the unknown numbers a, b, $z_{A1}$, $z_{A3}$, $z_{A4}$ and $z_{A5}$ respectively:

3.7463, 1.2755, 5.59, 7.127, 10.530 and 7.674.

Substituting the above values into the equation set (6) to obtain all the heights $Z_A(x_i, y_j)$, i=0, . . . , 12, j=0, 26, of the 351 sampled focused points $(x_i, y_j)$, i=0, . . . , 12, j=0, . . . , 26, as follows:

A data table of the heights of all the 351 focused points:

| | | | | | | | | | | | | | |
|---|---|---|---|---|---|---|---|---|---|---|---|---|---|
| 5.59 | 6.40 | 7.21 | 7.79 | 8.34 | 8.54 | 9.02 | 9.38 | 9.27 | 9.66 | 9.89 | 9.77 | 10.03 | 9.70 |
| 5.85 | 6.66 | 7.47 | 8.05 | 8.60 | 8.80 | 9.29 | 9.64 | 9.54 | 9.93 | 10.15 | 10.03 | 10.29 | 9.97 |
| 6.47 | 7.28 | 8.09 | 8.67 | 9.22 | 9.43 | 9.91 | 10.26 | 10.16 | 10.55 | 10.78 | 10.66 | 10.92 | 10.59 |
| 7.22 | 8.03 | 8.84 | 9.42 | 9.97 | 10.18 | 10.66 | 11.01 | 10.91 | 11.30 | 11.53 | 11.41 | 11.67 | 11.34 |
| 7.31 | 8.12 | 8.93 | 9.51 | 10.07 | 10.27 | 10.75 | 11.11 | 11.00 | 11.39 | 11.62 | 11.50 | 11.76 | 11.44 |
| 7.61 | 8.42 | 9.23 | 9.81 | 10.36 | 10.57 | 11.05 | 11.41 | 11.30 | 11.69 | 11.92 | 11.80 | 12.06 | 11.74 |
| 8.05 | 8.86 | 9.67 | 10.25 | 10.81 | 11.01 | 11.49 | 11.85 | 11.74 | 12.14 | 12.36 | 12.25 | 12.51 | 12.18 |
| 8.12 | 8.93 | 9.74 | 10.32 | 10.87 | 11.07 | 11.56 | 11.91 | 11.81 | 12.20 | 12.43 | 12.31 | 12.57 | 12.25 |
| 7.94 | 8.75 | 9.56 | 10.14 | 10.70 | 10.90 | 11.39 | 11.74 | 11.64 | 12.03 | 12.26 | 12.14 | 12.40 | 12.07 |
| 8.11 | 8.92 | 9.73 | 10.32 | 10.87 | 11.07 | 11.56 | 11.91 | 11.81 | 12.20 | 12.43 | 12.31 | 12.57 | 12.25 |
| 8.30 | 9.11 | 9.92 | 10.50 | 11.06 | 11.26 | 11.74 | 12.10 | 12.00 | 12.39 | 12.62 | 12.50 | 12.76 | 12.44 |
| 7.90 | 8.71 | 9.52 | 10.10 | 10.66 | 10.86 | 11.35 | 11.70 | 11.60 | 11.99 | 12.22 | 12.10 | 12.36 | 12.04 |
| 7.67 | 8.49 | 9.30 | 9.88 | 10.43 | 10.64 | 11.12 | 11.48 | 11.38 | 11.77 | 12.00 | 11.88 | 12.14 | 11.82 |

| | | | | | | | | | | | | |
|---|---|---|---|---|---|---|---|---|---|---|---|---|
| 9.75 | 9.69 | 9.78 | 9.52 | 9.51 | 9.36 | 9.21 | 8.86 | 8.47 | 7.98 | 7.57 | 7.21 | 7.13 |
| 10.02 | 9.95 | 10.05 | 9.78 | 9.77 | 9.63 | 9.47 | 9.13 | 8.74 | 8.25 | 7.84 | 7.47 | 7.39 |
| 10.64 | 10.58 | 10.67 | 10.41 | 10.40 | 10.25 | 10.10 | 9.76 | 9.37 | 8.87 | 8.47 | 8.10 | 8.02 |
| 11.40 | 11.33 | 11.42 | 11.16 | 11.15 | 11.00 | 10.85 | 10.51 | 10.12 | 9.63 | 9.22 | 8.85 | 8.77 |
| 11.49 | 11.42 | 11.52 | 11.25 | 11.24 | 11.10 | 10.94 | 10.60 | 10.21 | 9.72 | 9.31 | 8.95 | 8.87 |
| 11.79 | 11.72 | 11.82 | 11.56 | 11.55 | 11.40 | 11.24 | 10.91 | 10.52 | 10.02 | 9.62 | 9.25 | 9.17 |
| 12.23 | 12.17 | 12.26 | 12.00 | 11.99 | 11.85 | 11.69 | 11.35 | 10.96 | 10.47 | 10.06 | 9.70 | 9.62 |
| 12.30 | 12.24 | 12.33 | 12.07 | 12.06 | 11.91 | 11.76 | 11.42 | 11.03 | 10.54 | 10.13 | 9.77 | 9.69 |
| 12.13 | 12.06 | 12.16 | 11.90 | 11.89 | 11.74 | 11.59 | 11.25 | 10.86 | 10.37 | 9.96 | 9.60 | 9.52 |
| 12.30 | 12.24 | 12.33 | 12.07 | 12.06 | 11.92 | 11.76 | 11.42 | 11.04 | 10.54 | 10.14 | 9.77 | 9.70 |
| 12.49 | 12.43 | 12.52 | 12.26 | 12.25 | 12.11 | 11.95 | 11.61 | 11.23 | 10.73 | 10.33 | 9.96 | 9.89 |
| 12.09 | 12.03 | 12.12 | 11.86 | 11.85 | 11.71 | 11.56 | 11.22 | 10.83 | 10.34 | 9.93 | 9.57 | 9.49 |
| 11.87 | 11.81 | 11.90 | 11.64 | 11.63 | 11.49 | 11.34 | 11.00 | 10.61 | 10.12 | 9.71 | 9.35 | 9.27 |

Embodiment 2: a microscopic scanning method of the microscope:

Scanning patterns of the samples on the microscope slides by applying the heights on the curved surfaces of the microscope slides obtained in the embodiment 1.

A single layer of samples (which are microspheres uniform in size in the present embodiment) are uniformly coated on the microscope slides. The software is set to define the scanning region of 2.5 cm×1.5 cm in length and width. The region is sampling scanned by the microscope with 27 visual fields scanned at equal intervals in the X-axis direction, 13 visual fields scanned at equal intervals in the Y-axis direction, and 351 visual fields sampled in the overall region. The microspheres are uniformly distributed in the 351 visual fields.

The heights of the focused points within the 351 visual fields are obtained by the method of the embodiment 1. Under the NA1.25 100× lens, the DOF of the microscope lens is fixed. Therefore, it only needs to adjust a distance Δh between the lens and the sample under the corresponding focused point to meet the DOF. If $Z_A(x_0, y_0)$=5.59 is known and the distance between the sample and the lens satisfies the DOF during sampling scanning, the movement mechanism of the microscope lens will automatically move to the height corresponding to $Z_A(x_{12}, y_{26})$ when $Z_A(x_{12}, y_{26})$=9.27 is scanned; and the distance between the sample and the lens satisfying the DOF for clear imaging is ensured at the same time. Due to the automation technology, the lens is enabled to automatically move along 351 sampling points in sequence to take a photo of each visual field at the height of each point, thereby completing the sampling scanning on the scanning region of 2.5 cm×1.5 cm.

It is important to note that the heights of the same standard microscope slide measured in different devices are different. However, the position points in the measurement systems corresponding to the heights are the same. More clearly, the relative distance between the standard measuring points on the microscope slide is fixed. Thus, changes of the measured height of the same microscope slide in different measurement systems will not lead to the change of the distance between the standard measuring points; and the movement mechanism is still capable of driving the lens to the position point corresponding to the height in the measurement system of the measurement device, thereby achieving the purpose of enabling the lens to move to the corresponding position point for clear imaging and the purpose of automatic scanning.

The above description of embodiments disclosed in the present disclosure enables those skilled in the art to realize or use the present invention. Various modifications to these embodiments are obvious to those skilled in the art. General principles defined herein may be applied to other embodiments without departing from spirits or scopes of the present invention. Therefore, the present invention should not be limited to these embodiments illustrated herein, and should conform to the broadest scope consistent with the principles and novel features disclosed herein.

I claim:

1. A method for measuring and calculating heights on a curved surface of a microscope slide, comprising:
   dividing a measuring region of a known standard microscope slide into a plurality of surface regions, wherein a length of the measuring region along an X-axis direction is Lx, a length along a Y-axis direction is Ly, a coordinate of a standard measuring point B on any one of the surface regions within the measuring region is (x, y), a height of the point is measured as $Z_B(x, y)$, and coordinates of points at four corners of the measuring region are (0, 0), (Lx, 0), (Lx, Ly) and (0, Ly);
   measuring the coordinates of the standard measuring points in each of the surface regions within the measuring region; and measuring at least all the heights $Z_B(x, 0)$ and $Z_B(0, y)$ on two boundary lines along the X-axis direction and along the Y-axis direction and a height $Z_A(Lx, Ly)$ of a point with a coordinate (Lx, Ly);

providing another microscope slide with a size the same as the standard microscope slide, wherein the coordinates of the points at the four corners of the measuring region of the microscope slide to be measured are (0, 0), (Lx, 0), (Lx, Ly) and (0, Ly); the heights of the points at the four corners are $Z_A(0, 0)$, $Z_A(Lx, 0)$, $Z_A(Lx, Ly)$ and $Z_A(0, Ly)$ respectively; then a point A with a coordinate (x, y) corresponding to a standard measuring point with a coordinate (x, y) in the measuring region of the standard microscope slide necessarily exists in the measuring region of the microscope slide to be measured; and a height of the point A is $Z_A(x, y)$;

combining the following equations:

an equation for calculating a relative height of the standard measuring point on a boundary of the standard microscope slide:

$$D_B(x, 0) = \frac{(xn_{B1} + (Z_B(x, 0) - z_{B1})n_{B3})}{\sqrt{n_{B1}^2 + n_{B2}^2 + n_{B3}^2}} \quad (1)$$

$$D_B(0, y) = \frac{(yn_{B2} + (Z_B(0, y) - z_{B1})n_{B3})}{\sqrt{n_{B1}^2 + n_{B2}^2 + n_{B3}^2}};$$

wherein, $z_{B1}=Z_B(0,0), z_{B3}=Z_B(Lx,0), z_{B4}=Z_B(Lx,Ly)$, $n_{B1}=L_y(z_{B1}-z_{B3}), n_{B2}=L_x(z_{B1}-z_{B5}), n_{B3}=L_xL_y$, and $(n_{B1}, n_{B2}, n_{B3})$ is a normal vector of a plane defined by three standard measuring points with the coordinates (0, 0), (Lx, 0) and (0, Ly) on the standard microscope slide;

an equation for calculating a relative height of any one of the standard measuring points in the measuring region on the microscope slide to be measured:

$$D_A(x, y) = \quad (2)$$

$$D_B(x, 0) + f_x(x, a, L_x) + D_B(0, y) + f_y(y, b, L_y) + \frac{xyD_A(L_x, L_y)}{L_xL_y};$$

wherein, fx(x, a, Lx) is a height difference function for the points at the boundary along the X-axis direction of the microscope slide to be measured, and fy(y, b, Ly) is a height difference function for the points at the boundary along the Y-axis direction of the microscope slide to be measured;

an equation for calculating a relative height of the standard measuring point with the coordinate (Lx, Ly):

$$D_A(L_x, L_y) = \frac{(L_xn_{A1} + L_yn_{A2} + (z_{A4} - z_{A1})n_{A3})}{\sqrt{n_{A1}^2 + n_{A2}^2 + n_{A3}^2}}; \quad (3)$$

wherein, $z_{A1}=Z_A(0, 0)$, $Z_{A4}=Z_A(0, Ly)$;

$n_{A1}=L_y(z_{A1}-z_{A3}), n_{A2}=L_x(z_{A1}-z_{A5}), n_{A3}=L_xL_y$ (4);

wherein, $Z_{A3}=Z_A(Lx, Ly)$, $Z_{A5}\ Z_A(0, Ly)$;

and an equation for converting the relative height $D_A(x, y)$ of any one of the points in the measuring region on the microscope slide to be measured into the height $Z_A(x, y)$:

$$D_A(x,y)\sqrt{n_{A1}^2+n_{A2}^2+n_{A3}^2}=n_{A1}x+n_{A2}y+n_{A3}(Z_A(x,y)-z_{A1}) \quad (5)$$

obtaining an equation set about unknown numbers a, b, $z_{A1}$, $z_{A3}$, $z_{A4}$ and $z_{A5}$ according to the previous equations (1), (2), (3), (4) and (5):

$$\begin{cases} D_A(x_i, y_i) = \frac{(xn_{B1} + (Z_B(x_i, 0) - z_{B1})n_{B3})}{\sqrt{n_{B1}^2 + n_{B2}^2 + n_{B3}^2}} + f_x(x_i, a, L_x) + \\ \qquad \frac{(yn_{B2} + (Z_B(0, y_i) - z_{B1})n_{B3})}{\sqrt{n_{B1}^2 + n_{B2}^2 - n_{B3}^2}} + f_y(y_i, b, L_y) + \\ \qquad \frac{x_iy_i}{L_xL_y} \frac{(L_xn_{A1} + L_yn_{A2} + (z_{A4} - z_{A1})n_{A3})}{\sqrt{n_{A1}^2 + n_{A2}^2 + n_{A3}^2}} ; \\ D_A(x_i, y_i)\sqrt{n_{A1}^2 + n_{A2}^2 + n_{A3}^2} = n_{A1}x + n_{A2}y + n_{A3}(z_i - z_{A1}) \\ n_{B1} = L_y(z_{B1} - z_{B3}), n_{B2} = L_x(z_{B1} - z_{B5}), n_{B3} = L_xL_y \\ n_{A1} = L_y(z_{A1} - z_{A3}), n_{A2} = L_x(z_{A1} - z_{A5}), n_{A3} = L_xL_y \end{cases} \quad (6)$$

measuring the coordinates and the heights of any at least six standard measuring points in the measuring region of the microscope slide to be measured to obtain an input (xi, yi, zi), substituting the input into the equation set (6) to obtain a functional equation of the coordinates and the heights, and then inputting the coordinate (x, y) of any one of the standard measuring points on the microscope slide to be measured to obtain the corresponding height $Z_A(x, y)$.

2. The method according to claim 1, wherein the fx(x, a, Lx) is a polynomial with a power of K1; the fy(y, b, Ly) is a polynomial with a power of K2; and the coordinates and the heights of any K1+K2+2 standard measuring points in the measuring region of the microscope slide to be measured are measured to obtain the input (xi, yi, zi) to be substituted into the equation set (6).

3. A microscope to which the method according to claim 2 is applied.

* * * * *